United States Patent [19]

Wood

[11] 3,709,113
[45] Jan. 9, 1973

[54] SHUTTER CONTROL MECHANISM
[75] Inventor: Lawrence M. Wood, Rochester, N.Y.
[73] Assignee: Eastman Kodak Company, Rochester, N.Y.
[22] Filed: Sept. 13, 1971
[21] Appl. No.: 179,709

[52] U.S. Cl. ................95/10 CT, 95/53 EB, 95/53 E
[51] Int. Cl. ..............................................G03b 9/62
[58] Field of Search........................95/10 CT, 53 EB

[56] References Cited

UNITED STATES PATENTS 3,479,935   11/1969   Harvey................................95/53 EB
3,472,137   10/1969   Galbraith, Jr. ......................95/10 CT Primary Examiner—Samuel S. Matthews
Assistant Examiner—Russell E. Adams, Jr.
Attorney—W. H. J. Kline et al.

[57] ABSTRACT

A camera having shutter apparatus operable in two modes for opening and closing an exposure aperture and a third mode for flash photography. The shutter apparatus includes an electronic circuit having photosensitive means for controlling the operating of the electronic circuit as a function of scene light intensity. In the first mode of operation the electronic circuit actuates a detent mechanism when scene light is below a preselected level, for controlling the opening and closing of shutter means in a time interval dependent upon the scene light intensity. In the second mode of operation, when scene light is above the preselected intensity level, the detent is inoperative and the shutter mechanism opens and closes the exposure aperture at a preselected shutter speed. In the third mode of operation the electronic circuit actuates the detent mechanism for a fixed period of time to effect a shutter speed longer than that of the second mode.

12 Claims, 7 Drawing Figures

LAWRENCE M. WOOD
INVENTOR

PATENTED JAN 9 1973 3,709,113

LAWRENCE M. WOOD
INVENTOR

BY *R. Lewis Gable*
*W. H. J. Kline*
ATTORNEYS 3,709,113

SHUTTER CONTROL MECHANISM

CROSS REFERENCE TO RELATED APPLICATIONS

Reference is made herein to commonly assigned and related U.S. Pat. application, Ser. No. 179,708 entitled SHUTTER MECHANISM, filed in the names of Lawrence M. Wood and Jeffery R. Stoneham, on even date herewith.

BACKGROUND OF THE INVENTION

1. Field of the Invention

This invention relates to camera shutter mechanisms, and in particular to mechanisms for controlling a movement of shutter blades relative to an exposure aperture in a camera.

2. Description of the Prior Art

In an application entitled SHUTTER MECHANISM filed in the names of Lawrence Wood and Jeffery Stoneham, on even date herewith, a shutter mechanism is disclosed whereby a pair of shutter blades and springs are actuated by a shutter blade moving member thereby causing the springs to act in unison on the shutter blades for opening and closing the shutter blades accordingly at a fixed mechanical shutter speed.

It is frequently desirable, in cameras employing such a shutter mechanism, to vary the speed of operation of the camera shutter in order to enable the camera to make photographic exposures under various scene brightness conditions. A means commonly employed with shutter mechanisms of the type described in the above-identified application is to use a strong shutter return spring which biases the shutter to a closed position, and an adjustable rebound stop which is placed in the path of the shutter when the fast shutter speed is desired, to limit its opening movement and thereby reduce the period of time in which the exposure aperture is uncovered. Electronic circuitry including a transducer is also often used for controlling the opening and closing of the shutter blades in cameras having shutters of the type with two shutter blades, one of which opens the exposure aperture, and the other whose movement is controlled by the transducer, closes the exposure aperture. The electronic circuit and transducer apparatus as used in the two bladed shutter mechanism wherein the blades open and close in sequence is not readily applicable to shutter mechanisms having scissor-like shutter blades opened in unison and closed in the same manner as disclosed in the aboveidentified application.

SUMMARY OF THE INVENTION

Therefore it is an object of the present invention to provide an apparatus whereby a mechanical shutter mechanism may be operated on a timed basis.

It is another object of the present invention to control the speed of a camera shutter in a simple manner.

A further object is to provide a compact effective shutter mechanism which is economical to produce.

Other objects will be apparent from the description to follow and from the appended claims.

These and other objects are achieved in accordance with the teachings of this invention by a camera having shutter means operable in two modes for opening and closing an exposure aperture. The apparatus includes photosensitive means responsive to scene light for actuating a detent mechanism when scene light is below a predetermined intensity level. In the first mode, the shutter means is maintained in open position by the detent mechanism for an exposure interval determined by the intensity of scene light. In the second mode when the scene light intensity is above the predetermined level, the detent is inoperative to permit the shutter means to close at a preselected shutter speed.

BRIEF DESCRIPTION OF THE DRAWING

In the preferred embodiment of the invention described below, reference is made to the accompanying drawing, wherein.

DESCRIPTION OF THE PREFERRED EMBODIMENT

Because photographic cameras are well known in the art, the present description will be directed in particular to elements forming part of, or cooperating more directly with, the present invention, camera elements not specifically shown or described therein being understood to be selectable from those known in the art.

Briefly, the shutter mechanism provided hereby is operable in one of three modes depending upon the intensity level of the scene light. The first mode of operation is a fixed mechanical speed in which a pair of shutter blades are rotatably mounted on a common pivot, and adapted to cover and uncover an exposure aperture in a scissor-like fashion. The movement of the blades is effected by a bifurcated actuating or shutter blade moving member, which is coupled to the blades. The actuating member is biased towards a first position (in which the shutter blades are in their closed or aperture-covering position) by a pair of wire springs which are of sufficient strength to close the shutter from its open or aperture uncovering position to attain a fixed shutter speed. An arm of the actuating member is movable in a path across which lies a portion of one of the springs; the latter is engaged and deflected by the arm of the actuating member as the actuating member is driven to its second position (in which the shutter blades are opened), and this spring portion acts as a "kick" spring to start the return movement of the actuating member and thus acts together with the first spring to rapidly return the actuating member to its first position to attain the fixed shutter speed.

The shutter mechanism operates in a second mode when scene light intensity is below a predetermined level and too low for the fixed mechanical shutter speed, by providing for a controlled time exposure based on the intensity of incident scene light. An electronic timing circuit provides the controlled time exposure and includes a photosensitive element arranged to receive light for controlling the triggering of a trigger circuit having an output controlling a transducer. The transducer, in turn, operates a detent mechanism for preventing the return movement of the actuating member until the end of the controlled time interval.

The shutter mechanism is operable in a third mode other than the fixed mechanical and timed shutter speeds, for flash photography, wherein the electronic timing circuit includes circuitry that sets a fixed shutter speed for flash photography, commensurate with the useful time of the flash lamp unit used, and further adjusts the shutter speed when the camera is focused for shortened object distance.

Figure 1:
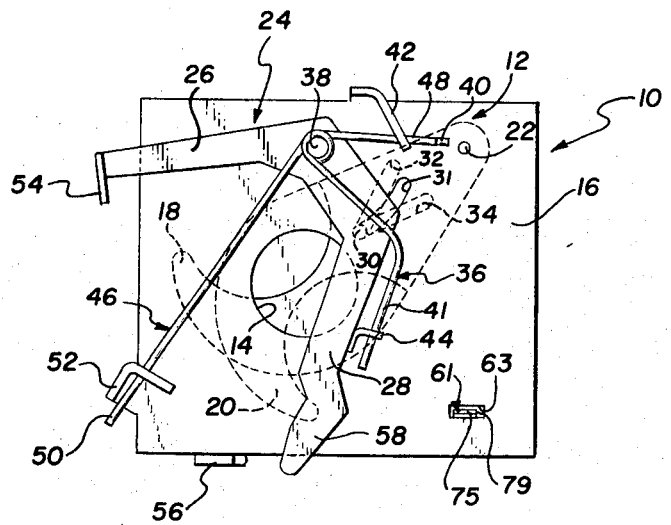
FIG. 1 shows schematically a front view of a shutter mechanism constructed in accordance with the invention, with a pair of shutter blades in a closed position.
Figure 2:
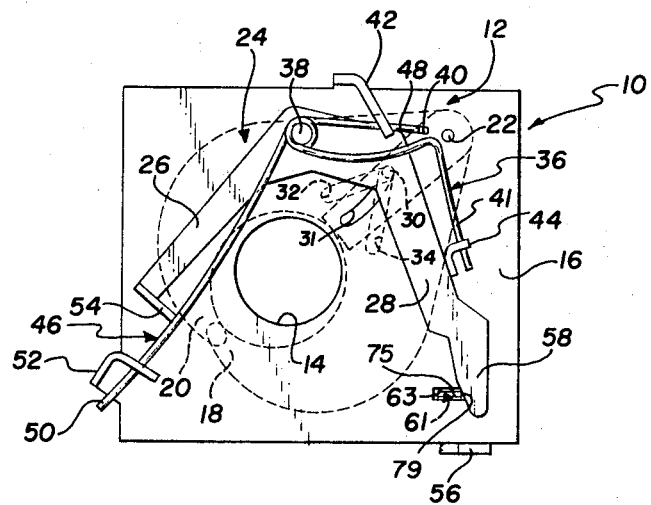
FIG. 2 shows the mechanism depicted in FIG. 1, with the shutter blades open.

Referring now to the drawings, and in particular FIGS. 1 and 2, a camera 10, partially shown, includes a shutter mechanism 12 which is operative to control the opening and closing of an exposure aperture 14 defined in an aperture plate 16. Disposed on one side of the plate 16, as shown by the dotted lines of FIGS. 1 and 2, are a pair of shutter blades 18 and 20, which are mounted for rotation about a common post or pivot 22. Blades 18 and 20 are thus movable in a scissor-like fashion in opposite directions and cooperate to close or cover aperture 14 whenever they overlap, in the area of the aperture.

The shutter blades are movable by a bifurcated actuating member 24, which includes a pair of arms 26 and 28, and a pin 30 which extends through a slot 31 in the aperture plate 16, and through transversely disposed slots 32 and 34 in the shutter blades 18 and 20. An actuating member 24 is mounted for rotation about a post or pivot 38, and the orientation of the slots 31, 32 and 34 is such that the pin 30 simultaneously engages the edges defining the slots 32 and 34 and drives the blades 18 and 20 apart towards their open positions (so as to uncover aperture 14) in response to the counterclockwise rotation of the aCtuating member 24, and drives the blades 18 and 20 together towards their closed positions (so as to cover aperture 14) in response to the clockwise rotation of the member 24.

A first spring 36, which is preferably a wire spring, is entwined about the post 38 and is held under tension by the retention of its leg 40 behind a tab 42 on the aperture plate 16, and of its leg 41 behind a tab 44 on the arm 28 of the actuating member 24. The spring 36 exerts a clockwise bias on actuating member 24.

A second or "kick" spring 46, which also is preferably a wire spring, is similarly entwined about the post 38, and has a first leg 48 restrained behind the tab 42 on the aperture plate 16, and a second leg 50 restrained against clockwise movement behind another tab 52 on the aperture plate 16. The leg 50 lies in the path of a tab 54 of the arm 26 of the actuating member 24, and when the latter is rotated by a sufficient distance (i.e. when the shutter blades 18 and 20 near the open position) from its first position, the tab 54 engages and deflects the leg 50. The deflection of the leg 50 moves the leg 50 away from the tab 52 as the shutter blades 18 and 20 reach the open position creating tension in the spring 46 to give the actuating member 24 a return kick and assist the spring 36 in driving the actuating member 24 to its first position.

The counterclockwise rotation of actuating member 24 is accomplished by means of a high energy lever or impact driver 56, pivotal on a pin 57 and which is driven from its position shown in FIG. 1 to that shown in FIG. 2 by a driving mechanism which can take a variety of forms which do not comprise part of the invention. The arm 28 of the actuating member 24 includes a nose 58 which lies in the path of the impact driver 56 and is displaceable thereby. The force with which the nose 58 is struck by the impact driver 56 must be sufficient to rotate the actuating member 24 to deflect the springs 36 and 46 and to open the shutter blades 18 and 20.

Figure 3:
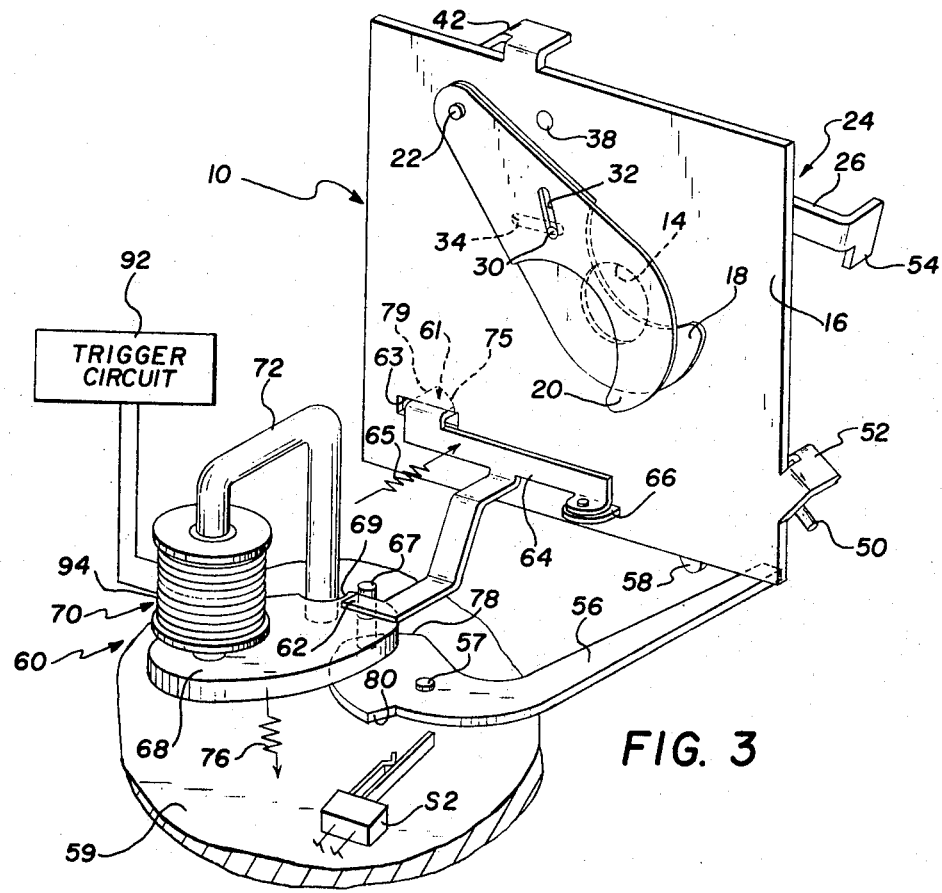
FIG. 3 is a perspective rear view of the mechanism of FIG. 1 showing an electromagnet and detent mechanism for providing a variable shutter speed, the mechanism shown in a cocked position.
Figure 4:
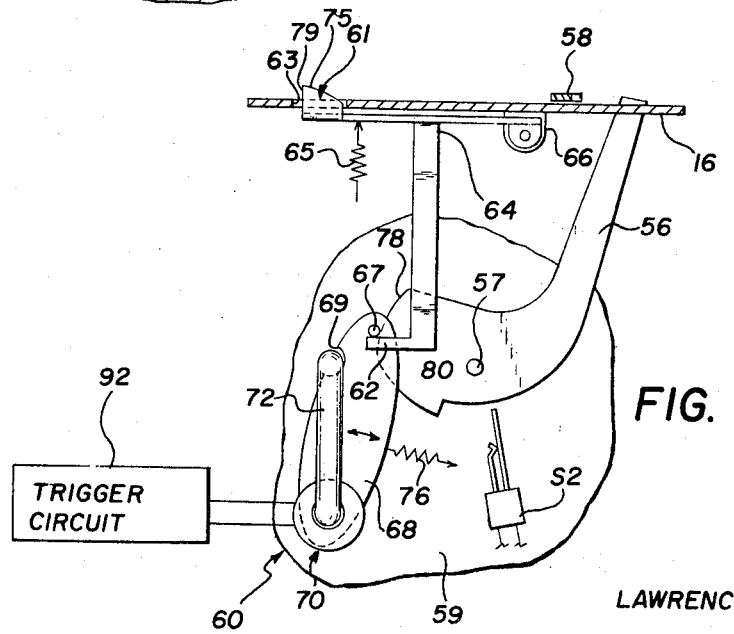
FIG. 4 is a plan view of the mechanism of FIG. 3.
Figure 5:
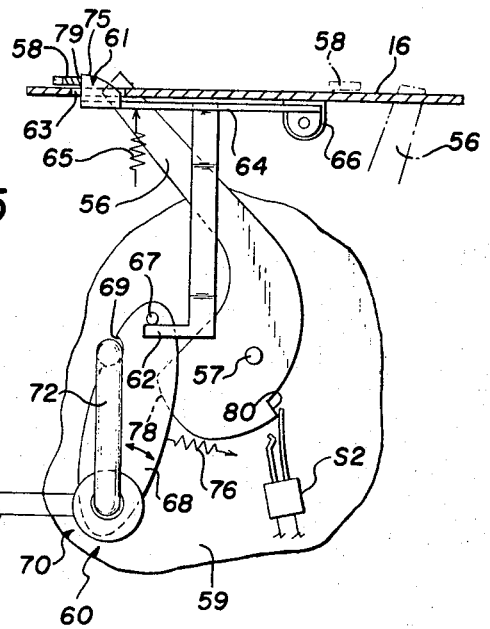
FIG. 5 is a plan view of the mechanism of FIG. 3 in the release state wherein the shutter blades are open and the detent mechanism engages an actuating member.
Figure 6:
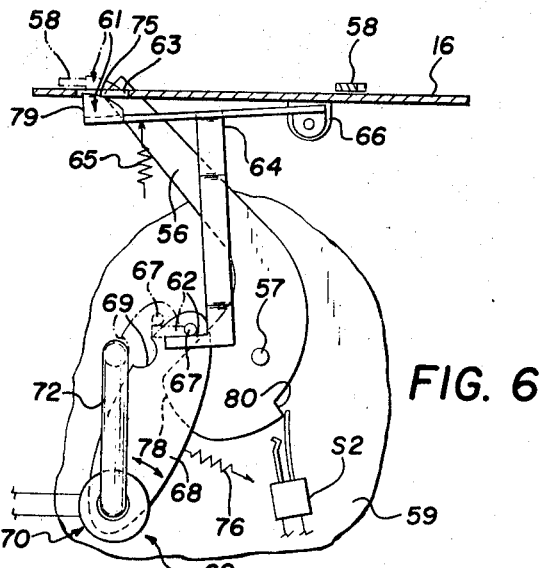
FIG. 6 is a plan view of the mechanism of FIG. 3 where the detent mechanism has released the actuating member and the shutter blades have closed.

As previously stated, the operation of the shutter mechanism 12 may be in one of three modes, depending upon the intensity of the scene light. To facilitate the multiple modes of operation, there is provided a detent mechanism 60, shown in FIGS. 3-6, and in particular FIGS. 3 and 4, wherein the detent mechanism 60 is shown supported on a camera plate 59. The detent mechanism 60 is disposed relative to an opening 63 of the plate 16, for movement into and out of engaging positions for the actuating member 24. The detent mechanism includes a T-shaped lever 64, one arm of which defines a detent 61, and the other arm is mounted for pivotal movement on a hinge 66, affixed to the plate 16, against a bias of a spring 65. Movement of the detent 61 relative to the opening 63 is accomplished through a pin 67 which is mounted on an armature 68, which armature 68 is movable, as shown by the arrow A, about a yoke 72 of an electromagnet 70, under the bias of spring 76. The strength of the spring 76 is greater than that of the spring 65, and overcomes the spring 65 when the armature pivots. The pin 67 engages a tab 62 on the post of the T-lever 64 when the apparatus is in the position of FIG. 3, and movement of the armature 68 about the yoke 72 pivots the T-lever 64 on the hinge 66, thereby moving the detent 61 into and out of the opening 63. The detent 61 is positioned to protrude through the opening 63 by means of a cam surface 78 on the impact driver 56, which cam surface 78 engages the pin 67, biasing the armature 68 into the yoke 72 wherein a notch 69 engages the yoke 72, thereby positioning the detent 61 in the opening 63. As may best be seen from FIG. 5, when the apparatus operates in ambient scene light, the first mode of operation as previously discussed, the impact driver 56 moves to engage the actuating member 24, and the cam surface 78 rotates, releasing the pin 67. As shown in FIG. 6, the cam surface 78 releases the pin 67 and the armature 68 pivots on the yoke 72 under the bias of the spring 76 pivoting the T-lever 64 on the hinge 66, removing the detent 61 from the opening 63. In this manner, the nose 58 moves back over the opening 63 allowing the blades 18 and 20 to close at a fixed rate.

When the intensity of the scene light is too low for exposure in the fixed shutter speed mode of operation, an electronic circuit to be discussed later, is operative to control the detent mechanism 60 in a manner to maintain the detent 61 in the opening 63 as shown by the phantom lines of FIG. 6, for engaging the nose 58, thus preventing the actuating member 24 from closing the blades 18 and 20. During this timed mode of operation, the electromagnet 70 becomes energized and the armature 68 is attracted to the yoke 72, the position of FIG. 3. Therefore, the armature 68 is not free to pivot about the yoke 72 as the impact driver 56 moves to open the blades 18 and 20 and the T-lever 64 is maintained with the detent 61 protruding through the opening 63. To facilitate the movement of the nose 58 over the opening 63, but engage the nose 58 as it attempts to move back over the opening 63, the detent 61 is provided with a cam surface 75 and a square surface 79, as may be best seen in FIG. 4, which cam surface 75 is engaged by the nose 58 of the actuating member 24 as it moves to open the blades 18 and 20. As the nose 58 engages the cam surface 75, the T-lever 64, being freely movable on the hinge 66, against the bias of the spring 65, will move out of the opening as the actuating member 24 engages it, allowing the actuating member 24 to move past the opening 63. However, prior to the return movement of the nose 58, the spring 65 will move the T-lever 64 back into a position wherein the detent 61 protrudes into the hole 63, and the square surface 79 will engage and hold the nose 58 as the springs 36 and 46 move the actuating member 24 to close the blades 18 and 20. A switch S2 is positioned adjacent to a cam lobe 80 on the cam surface 78 so that as the impact driver 56 moves to engage the actuating member 24 to open the blades 18 and 20, the cam lobe 80 opens the switch S2. The switch S2 is a timing switch in the electronic circuit, which when opened, initiates the timing cycle as will be described in more detail later. The nose 58 will be held for a time interval that depends upon the operation of the electronic circuit of FIG. 7.

Figure 7:
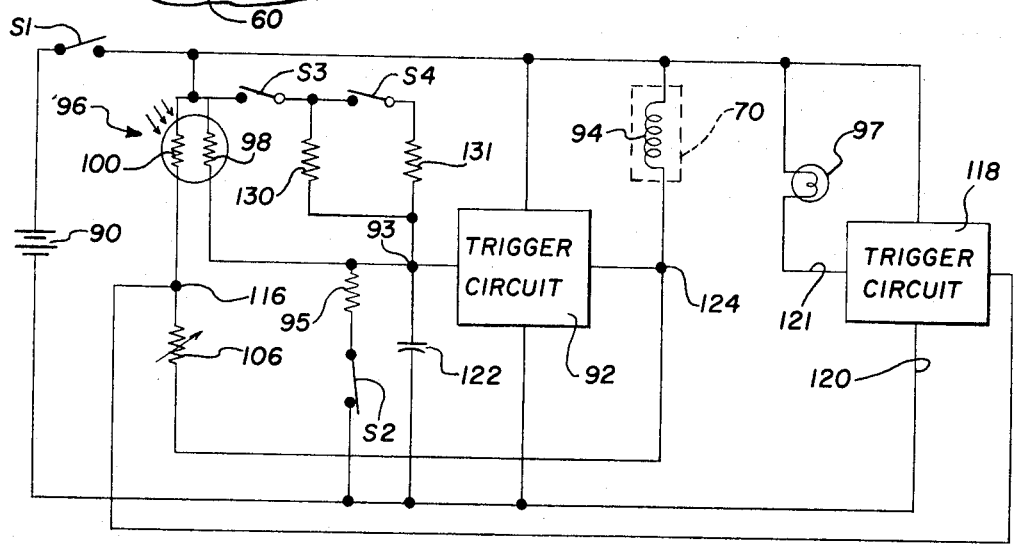
FIG. 7 is a schematic diagram of an electronic circuit for use with the mechanism of FIGS. 1 and 3.

The circuit of FIG. 7 is adapted to be actuated as a switch S1 is closed upon a slight actuation of the camera release member, not shown. Closure of the switch S1 connects a battery 90 in circuit with a trigger circuit 92 which serves, as will be explained, to energize a coil 94 associated with the electromagnet 70. The trigger circuit 92 is adapted to be conducting or non-conducting immediately upon closure of the switch S1, depending upon the intensity of the scene light. If intensity of the scene light is above a first predetermined value, the trigger circuit 92 is biased to the non-conducting state, as will be explained subsequently. If the intensity of the scene light is below this predetermined value, upon application of the potential, the trigger circuit 92 is immediately disposed from a first or the non-conductive state to a second or conductive state to thereby establish a conductive path through the coil 94 in circuit with the battery 90. As a result, the electromagnet 70 is energized and the armature 68 is attracted to, and held by the yoke 72. If the scene light is relatively high, or above the first predetermined value, the trigger circuit 92 is biased in the second or non-conducting state, thereby maintaining the electromagnet 70 in the deenergized state.

If the scene illumination is below a second predetermined level, an indicator lamp 97 will be energized to provide an indication thereof. The indicator lamp 97 is operated in conjunction with a radiation sensitive assembly 96 which includes first and second radiation sensitive elements 98 and 100, both responsive to the incident scene radiation to vary a parameter, e.g. electrical resistivity, as a function of the incident scene radiation. When the trigger circuit 92 is disposed in its first or conductive state, a circuit is established through radiation sensitive element 100 and variable impedance 106 to the negative terminal of the battery 90, so that the impedance 106 and element 100 form a voltage dividing network, the junction point of which is connected to an input terminal 116 of a trigger circuit 118. If the resistivity of the radiation sensitive element 100 exceeds a predetermined value, i.e., the incident scene radiation is below a second predetermined value lower than the first value, a signal will be applied to the input terminal 116 which will dispose the trigger circuit 118 from its first or nonconductive state to a second or conductive state to thereby provide a conductive path between its terminals 120 and 121 and to energize the indicator lamp 97. The energized lamp 97 indicates that the incident scene illumination is too low to provide a normal exposure without the aid of an additional light source or camera support.

The switch S2, normally in a closed condition, short-circuits a capacitor 122 to ground, and the switch S2, when opened, initiates the exposure interval. More specifically, a time integration circuit is formed by the capacitor 122 and the radiation sensitive element 98. The capacitor 122 charges at a rate determined by resistivity of the element 98; therefore, a potential at a junction 93 therebetween increases at a rate which is a function of the incident scene radiation. When the capacitor 122 has charged to a level corresponding to the threshold level of the trigger circuit 92, the circuit 92 is disposed from its second or conductive state to its first or nonconductive state to thereby de-energize the coil 94. The threshold level of the trigger circuit is set illustratively at a value of 0.6 times the voltage of the battery 90. This threshold level whereby the trigger circuit 92 is biased to the non-conducting state may be reached in a second manner by means of a resistance 95 connected in series with the element 98 to thereby form a voltage dividing network for establishing a voltage at junction 93 immediately after the switch S1 is closed. If scene light is high, the impedance of the element 98 will reach a preselected value which establishes a voltage level at the junction 93 (immediately upon closure of the switch S1) sufficient to render the trigger circuit 92 to its nonconductive state and, consequently the electromagnet 70 will not become energized.

A feed-back path is provided between an output terminal 124 of the trigger circuit 92 and the input terminal 116 of the trigger circuit 118. As a result, when the trigger circuit 92 is disposed in its first or nonconductive state, the circuit between the input terminal 116 of the trigger circuit 118 through the variable impedance 106 and the negative terminal of the battery 90 is broken and the potential applied to the input terminal 116 approaches that potential of the positive terminal of the battery 90. At this more positive potential, the trigger circuit 118 is disposed in its first or nonconductive state to thereby de-energize the indicator lamp 97. As a result of the feed-back-path, the indicator lamp 97 is used to not only indicate a low light condition under which sufficient film exposure cannot be achieved without the aid of an additional light source or camera support, but also to indicate the termination of an extended or timed exposure.

A further feature is provided in the circuit of FIG. 7 for use when the scene illumination is below the second preselected intensity level, in that, a switch S3 is disposed to couple a resistance 130 in parallel circuit with the element 98. The switch S3 may for example be actuated by insertion of a flash lamp unit (not shown) into a camera receptacle (not shown). By actuating the switch S3, the parallel combination of the element 98 and resistance 130 is connected in circuit between the battery 90 and the capacitor 122. The resistance of the combination is light dependent but provides a maximum time interval of an open shutter condition for use in flash photography. A second switch S4 is adapted to couple a resistance 131 in parallel circuit with the resistance 130 and element 98 by means of, for example, a focus adjustment for photography at shortened object distance. When the switches S3 and S4 are both closed during the time interval of exposure, the parallel resistance established by resistances 130, 131 and the element 98 reduces the composite value of the elements by an amount sufficient to reduce the exposure interval for exposure to be taken at a shortened object distance. It is to be noted in FIG. 7, that the switch S4, if closed without a flash lamp unit inserted in the camera for closing the switch S3, is not effective to reduce the time interval of exposure from that established by the element 98 and the capacitor 122.

In the operation of the shutter mechanism 12, during the first mode of operation when scene light intensity is high, the electronic trigger circuit 92 is biased to the non-conducting state by the voltage divider resistance of element 98 and resistor 95 at junction 93. An operator actuates a camera release, not shown, releasing the impact driver 56 for movement under its bias, the impact driver 56 engages the nose 58 of the actuating member 24, pivoting the actuating member 24 counter-clockwise. Remembering that the trigger circuit 92 is in the nonconductive state, the electromagnet 70 is not energized, and the armature 68 is not attracted to the yoke 72 and is free to pivot on the yoke 72. The armature 68 being free to pivot, allows T-lever 64 to pivot on the hinge 66 and remove detent 61 from the opening 63. The pin 30 moves in slots 31, 32 and 34 as the blades 18 and 20 open, as shown in FIG. 2, permitting scene light to pass through the exposure aperture 14. As further shown in FIG. 2, the movement of the actuating member 24 creates tension in the spring 36 as the blades 18 and 20 open, and the tab 54 of the arm 26 engages the spring 46, deflecting the spring 46 away from tab 52. This deflection of the spring 46 produces tension in the spring 46, and the spring 46 acts as a "-kick" spring to give the actuating member 24 and initial start back to the closed position of the blades 18 and 20. When the tension of the spring 46 is added to the tension of the spring 36, the blades 18 and 20 are rapidly closed by pivoting the actuating member 24 clockwise. The shutter speed thus obtained is a fixed shutter speed which may be set at the desired rate of opening and closing by adjusting the tension in the springs 36 and 46.

In a second mode of operation when the scene light is below the first predetermined value, the voltage level at the junction 93 is below the level which biases the trigger circuit 92 into the nonconductive state and the trigger circuit 92 is biased in the conductive state when switch S1 is closed. As in the operation previously described, the impact driver 56 moves to engage the arm 28 of the actuating member 24, and pivots the actuating member 24 to open the blades 18 and 20. The movement of actuating member 24 brings nose 58 over the opening 61 into engagement with the detent 61 protruding therethrough, as shown in FIG. 6. The trigger circuit 92 is in the conductive state and the electromagnet 70 is energized, and the armature 68 is attracted to the yoke 72; and therefore the bias of the spring 76 does not pivot the armature 68 as the cam surface 78 moves away from pin 66. The T-lever 64 is therefore maintained in the position of FIG. 4 under the bias of the spring 65, wherein the detent 61 protrudes through the opening 63. As the nose 58 engages the cam surface 75, the T-lever is pivoted on the hinge 66 momentarily removing the detent 61 from the opening 63; however, the bias of the spring 65 is sufficient to move the detent 61 back into the opening 63 as the nose 58 passes the opening 63, and the square surface 79 engages the nose 58, as shown by FIG. 5. As the impact driver 56 moves, the cam lobe 80 engages the switch S2, opening the switch to start the time interval; and at the end of the time interval, the trigger circuit 92 is switched to the nonconductive state, thereby de-energizing the electromagnet 70. As the flux field of the electromagnet collapses, the yoke 72 and the armature 68 separate, and under the bias of the spring 76 the armature pivots, pivoting the T-lever 64. As the T-lever 64 pivots, the detent 61 moves out of the opening 63 freeing the arm 28, and the shutter blades 18 and 20 close the aperture 14.

The operation of the apparatus in the third mode of operation may be used if desired when the intensity of the scene light is below the second preselected level. Operation of the camera at the lower light intensity may be accomplished in the second mode, however, due the low level of light, producing a high resistance in the element 98, the time constant of the integrating circuit is long, and the shutter remains open for an extended time interval. The operation in the third mode, therefore, establishes a maximum time interval for flash photography and the basic operation of the apparatus the same as that of the second mode. In the third mode, the switch S3 is closed, connecting the parallel combination of the resistor 130 and element 98 in series with the capacitor 122 for establishing a time constant for the integrating circuit. The time constant allows the trigger circuit 92 to be switched to the nonconducting state at a preselected time to allow closure of the blades 18 and 20 at a shutter speed commensurate with the useful duration of the light from the flash lamp.

The invention has been described in detail with particular reference to preferred embodiments thereof, but it will be understood that variations and modifications can be effected within the spirit and scope of the invention.

I claim:

1. In a camera having shutter apparatus for opening and closing an exposure aperture for controlling the passage of scene light therethrough, said apparatus comprising in combination:

a. shutter means movable between open and closed positions of the exposure aperture, said shutter means operable in a first mode for providing a fixed preselected exposure interval, and operable in a second mode for providing a variable exposure interval;

b. detent means movable from a first position wherein said detent means retains said shutter means in the open position during said variable exposure interval, to a second position wherein said detent means permits said shutter means to move to the closed position; and c. an electronic circuit for actuating said detent means to said first position for a variable interval of time dependent upon the intensity of scene light, and responsive to scene light in excess of a preselected intensity level for actuating said detent means to said second position to permit said shutter means to close at said fixed preselected exposure interval.

2. Exposure control apparatus for controlling the exposure of a light sensitive medium to scene light through an exposure aperture, said apparatus comprising:

a. shutter means movable between closed and open positions in relation to the exposure aperture;

b. first and second spring means;

c. a member for directing said shutter means between said closed and open positions, said member being coupled to said shutter means and having first and second arms joined for movement from a first to a second position about a juncture of said arms, said first arm being engageable by said first spring for displacing said member towards said first position, said second arm being engageable by said second spring means in response to rotation of said member towards said second position, said second spring means being deflectable by said second arm and operable to displace said member toward said first position;

d. means for moving said member to said second position;

e. releasable means for engaging said member in said second position, said releasable means being actuatable for releasing said member to permit said first and second spring means to move said member to direct said shutter means to said closed position; and f. an electronic circuit including photosensitive means arranged to receive scene light, said circuit being operative to actuate said releasable means to permit said member to move said shutter means to said closed position after an interval of time which is related to the intensity of the light received by said photosensitive means.

3. In a camera, exposure control apparatus movable between closed and open positions relative to an exposure aperture for controlling the passage of scene light therethrough, said apparatus comprising:

shutter means movable between open and closed positions of the exposure aperture, said shutter means operative in a first mode to provide a fixed preselected interval of exposure and operative in a second mode to provide a variable interval of exposure related to scene light intensity;

means for moving said shutter means between the open and closed position in said fixed interval of exposure;

a detent movable from a first position wherein said detent is disposed to retain said shutter means in the open position, to a second position wherein said detent permits said shutter means to be moved to the closed position; and circuit means responsive to variations in scene light intensity and including means for actuating said detent to move to said second position after said variable interval of exposure thereby permitting said shutter means to be moved to said closed position, said circuit means also being responsive to scene light intensity above a predetermined intensity level for actuating said detent to said second position in a proper timed relation with respect to movement of said shutter means such that said shutter means can be moved to the closed position after said fixed preselected interval.

4. Apparatus as claimed in claim 3 wherein said means for moving said shutter means comprises an actuating member movable from a first to a second position for opening said shutter means, said actuating member including spring means for returning said shutter means to the closed position.

5. In a camera, exposure control apparatus for opening and closing an exposure aperture for controlling the passage of scene light therethrough, said exposure control apparatus comprising:

shutter means movable between open and closed positions relative to the exposure aperture;

impact means for moving said shutter means from the closed to the open position;

means for returning said shutter means to the closed position after a fixed preselected interval of exposure;

detent means mounted for movement from a first position wherein said detent means retains said shutter means in the open position, to a second position for permitting said shutter means to be moved to the closed position;

a transducer including an armature, said transducer being energizable for retaining said armature in a first position wherein said armature engages said detent and retains said detent in said first position, said transducer being deenergizable for permitting said armature to move to a second position for moving said detent to said second position;

means for moving said armature from said first to said second position; and circuit means responsive to scene light for energizing said transducer when the intensity of the scene light is below a predetermined intensity level and for deenergizing said transducer after a time interval dependent upon the intensity of the scene light.

6. Apparatus as claimed in claim 5 wherein said detent means includes spring bias so that as said shutter means opens said shutter means engages said detent momentarily pivoting said detent out of the engagement position with said shutter means, said spring means urging said detent back into said engaging position.

7. In a camera having shutter means and means for moving said shutter means between closed and open positions relative to an exposure aperture for controlling the passage of scene light therethrough, shutter control apparatus comprising:

a. a transducer;

b. circuit means coupled to said transducer and responsive to scene light for energizing said transducer when the intensity of the scene light is below a predetermined level and for deenergizing said transducer after a time interval related to the intensity of the scene light, said circuit also being responsive to scene light above said preselected intensity level for maintaining said transducer in its deenergized condition;

c. a detent disposed in a first position and responsive to energization of said transducer when scene light is below said preselected intensity for retaining the shutter means in its open position, said detent being movable to a second position upon deenergization of said transducer to establish an exposure interval related to scene light intensity said detent movable to said second position when said circuit detects scene light intensity above said preselected level for permitting said shutter means to move to its closed position after a preselected interval of exposure.

8. Apparatus as claimed in claim 7, wherein said detent comprises a member having two arms, said member being pivotal about one arm of said arms for movement of the other arm of said arms from a first to a second position relative to said shutter means, and a bias means urging said other arm to said first position wherein said other arm engages the shutter means when said shutter means is in the open position.

9. Apparatus as claimed in claim 7, wherein the shutter means comprises a pair of shutter blades movable in a scissor-like manner between open and closed positions relative to the exposure aperture by means of an actuating member movable from a first to a second position for opening the shutter blades, said detent being movable relative to said actuating member for retaining said actuating member in said second position wherein said shutter blades are in the open position, said detent being movable to permit said actuating member to move to said second position wherein said shutter blades are in the closed position.

10. Apparatus as claimed in claim 9, wherein said detent engages said actuating member for retaining said shutter blades in the open position.

11. Apparatus as claimed in claim 10 wherein said transducer includes an armature engaging said detent, said armature being actuatable by said transducer for retaining said detent in said first position and deactuatable for permitting said detent to move to said second position.

12. Apparatus as claimed in claim 11 including impact means movable from a first to a second position for engaging said actuating member for moving the shutter blades to the open position, said impact means including a cam surface, said cam surface disposed relative to said armature for retaining said armature in said first position when said impact means is in said first position, said cam surface being movable relative to said armature for permitting said armature to move said detent from said first to said second position when said impact means moves to said second position.

* * * * *